Patented May 6, 1941

2,240,778

UNITED STATES PATENT OFFICE 2,240,778

METHOD OF AND MEANS FOR CURING CONCRETE

Carll W. Hunt, Los Angeles, Calif., assignor to Hunt Process Company, Los Angeles, Calif., a partnership composed of Carll W. Hunt and Percy G. Whitman No Drawing. Application November 21, 1938, Serial No. 241,669

7 Claims. (Cl. 25—154)

This invention is particularly directed to methods and means for curing concrete containing hydraulic or Portland cement as a cementitious material. Heretofore, concrete has been cured by covering the same with earth, sand, burlap, sawdust and the like, saturated with water. This porous covering was sprinkled or watered periodically over a period of a week or two in order to keep it wet and to permit the concrete to thoroughly hydrate and develop necessary strength. Usually the covering material is not applied until after the concrete or other cementitious body has become sufficiently coherent to support such covering material. The method is not applicable where the surface of the concrete is at an appreciable angle to the horizontal. Curing of large blocks of concrete such as are encountered in gravity dams and the like, is particularly important. Ordinarily, the covering material is applied to the top only and is eventually removed by brushes, sand and water blasting, or the like, whereupon another superimposed block of concrete is poured. It is necessary that a thorough and complete bond exist between the portion of concrete originally poured and that subsequently poured.

In recent years, the surface of concrete has been sealed so as to retard evaporation, by means of resinous or paint or lacquer-like sealing media which may be applied manually or by means of spray guns. These sealing media are applied to the surfaces of concrete as soon as the forms are removed or onto the top surface as soon as possible after placing and finishing, or after a partial set has been attained. These sealing media may be applied to inclined surfaces. Often the surface of the concrete is thoroughly wetted with water before the sealing film is applied. The sealing film is ordinarily adapted to completely envelope and enclose the concrete, thereby retarding evaporation and retaining the water in the concrete, rendering the original water content available for further crystallization and hydration of the cementing constituents of the concrete.

It has been found, however, that these sealing media often penetrate into the concrete for a short distance, say ⅛ inch to ¼ inch, rendering their removal extremely difficult or impossible. Some sealing media permanently stain or discolor the concrete. Other sealing media weaken the exterior surface of the concrete, rendering such surface weak and crumbly and exposing the aggregate, thereby disfiguring the completed structure from an architectural or decorative standpoint.

The present invention relates to a method and materials for use therein, whereby discoloration of concrete is obviated, no weakening of the exterior surface of the concrete is produced and the removal of the sealing coat is facilitated, while moisture is effectively retained in the concrete and made available for crystallization and hydration of the cement.

Generally stated, the invention comprises the steps of first applying a cushioning slip coat onto the surface of the concrete and thereafter applying a sealing coat, the cushioning or slip coat preventing the sealing material from contacting the concrete directly and functioning to retain additional moisture around the exterior of the concrete. Since a bond directly between the seal coat and the concrete does not exist, the slip coat may be readily removed. In order to function properly, the slip coat must preferably be an aqueous dispersion or suspension containing sufficient solids so as to form a deposit or coating on the concrete. The slip coat composition should be free from any substances which might combine with, penetrate into, or weaken the concrete. Furthermore, the composition used should be capable of adhering to concrete during application and drying and should not shrink excessively during drying. Excessive shrinkage is ordinarily exhibited by pronounced cracking and peeling which interferes with the continuity of the subsequently applied sealing coat.

An object of this invention is therefore to provide a method of curing concrete in a readily effective and facile manner.

Another object is to provide a method of curing concrete provided with substantially vertical walls.

A still further object is to disclose a method of preventing the evaporation of moisture from inclined surfaces or freshly cast concrete and other cementitious compositions.

Another object is to provide ingredients and compositions particularly adapted for use in providing moisture-retaining flexible sealing compositions upon the surfaces of cementitious bodies.

A still further object is to provide compositions and ingredients specifically adapted for use in curing concrete.

Those skilled in the art will be fully apprised of the various uses, modifications, adaptations and advantages of the invention from the following description.

In performing the method of this invention, the exposed surfaces of the concrete or other cementitious bodies, after it has set sufficiently to have assumed a consistency or strength permitting the successful application of coating materials to the surface thereof, are coated with a slip coat which, as stated hereinbefore, contains a liquid medium and solids dispersed or suspended therein. An effective slip coat can be made by employing diatomaceous earth suspended in an aqueous solution containing a starch. Good results have been obtained by the use of about 8% to 30% of diatomaceous earth by weight and from about 2% to 10% of cornstarch or arrowroot starch. The starch suspension in water is preferably brought to a boil or heated before the diatomaceous earth is added thereto. When the slip coat is applied by means of a brush, the composition may contain from say 8% to 15% of diatomaceous earth by weight, but in the event means are available for thoroughly agitating to a slurry and to apply said slurry by means of a spray gun, then the composition may contain up to 30% of diatomaceous earth. The starches specifically referred to have been found to give splendid results. Wheat flour, sodium alginate, and other gummy materials or hydrophylic colloids, may be used but not as advantageously. Instead of diatomaceous earth, basic magnesium carbonate, wood flour, or other relatively light, porous, inert, solid materials may be employed. It is to be remembered that any slip coat composition capable of absorbing and holding moisture and not subject to cracking or excessive shrinkage during drying and incapable of deleteriously effecting the cementitious body to which it is applied, may be used.

After the slip coat described hereinabove has been applied to form an appreciable deposit or coating on the concrete or other cementitious body, such coating ordinarily having a thickness of about 1/32–1/8 inch, a sealing coating is then applied. The sealing coat should be applied prior to complete dehydration of the slip coat. The sealing coat may consist of any paint-like or lacquer-like composition adapted to form a protective film. Generally stated, such film should be weather-resistant and capable of retarding evaporation of moisture from the slip coating and cementitious composition underlying the slip coat. Asphaltic compositions and emulsions, resins, cellulose derivatives or lacquers in oily or volatile solvents may be employed for the sealing coat. Mixtures of drying oils and waxes or waxy materials either emulsified in aqueous media or dissolved in solvents such as petroleum distillates, may be used. A sealing coat composed of about 30% China-wood oil, 10% of paraffin and 60% of petroleum distillate, has been employed.

The sealing coat should in all events form a protective skin or film which preferably is flexible and continuous so that evaporation of moisture from the slip coat and from the cementitious body is retarded. The slip coat prevents the sealing material from coming in contact with the cementitious body and in this manner prevents discoloration, weakening or pitting of the cementitious material. In the event the sealing coat results in the formation of a flexible film, accidental blows struck against such sealing coat will not puncture the film and permit the escape of moisture.

By proceeding in the manner described, moisture originally contained in the cementitious material plus that contained in the slip coat is maintained in operative contact with the cementitious materials so that during hydration, setting, hardening and curing the cementitious body has an opportunity of developing the maximum strength. After such coatings have been maintained on the cementitious body for a desired period of time (say from three days to three weeks), they may be readily removed by means of scraping tools or by water jets, brushes, etc. The process of the invention is of particular advantage when it is applied to large massive works which can only be poured in sections, upper or higher sections being then poured or cast upon lower previously formed sections, as is the case in dam construction.

The methods and means of this invention permit the ready removal of the sealing coat and the slip or cushioning coat which, upon drying, is readily powdered and can be readily removed or washed off after the sealing coat has been punctured. The superimposed blocks or masses of cementitious material can be caused to thoroughly bond with the underlying previously formed sections.

A further advantage of the means and methods of this invention lies in that the slip coat is light in color or almost white, thereby acting to reflect heat rays and preventing the concrete from becoming unduly hot during the day. Concrete expands with rise in temperature and such expansion is detrimental to strength. When transparent, clear or translucent seal coats are used, the underlying slip coat functions effectively in preventing the concrete from becoming too hot. In some instances, it has been found advantageous to apply a slip coat of this invention over (as well as under) the seal coat so as to provide a white, heat-reflecting surfacing. The seal coat thus may carry a white or other light-reflective pigment.

I claim:

1. In a method of curing cementitious bodies, the steps of: spraying onto the surface of a cementitious body, an aqueous substantially liquid suspension containing from about 8% to 30% by weight of finely divided diatomaceous earth and from 2% to 10% of starch, to form an adhering coating; and then applying a sealing medium to the surface of said coating, said sealing medium being adapted to form a film resistant to weathering and passage of moisture therethrough.

2. In a method of curing cementitious bodies, the steps of: applying, to the surface of a cementitious body, an aqueous suspension containing from about 8% to 30% by weight of finely divided diatomaceous earth and from 2% to 10% of starch, to form a coating: and then applying a sealing medium to the surface of said coating, said sealing medium being adapted to form a film resistant to weathering and passage of moisture therethrough, said sealing medium being applied prior to complete dehydration of said coating.

3. A slip coat composition for use on cementitious bodies comprising: finely divided diatomaceous earth in an aqueous medium containing a starch.

4. A slip coat composition for use on cementitious bodies comprising: an aqueous suspension containing between 8% and 30% by weight of finely divided diatomaceous earth and between 2% and 10% of starch.

5. A slip coat composition for use on cementitious bodies comprising: a finely divided, solid, porous, absorbent material in suspension in an aqueous medium containing starch, the absorbent material being present in larger amounts than said starch.

6. In a method of curing cementitious bodies, the steps of: spraying an aqueous suspension of finely divided absorbent material onto the surface of a cementitious body to form a removably adherent coating thereon, said aqueous suspension including a starch; and then applying a sealing medium to the surface of said coating to form a film adapted to retard evaporation of moisture from said coating and cementitious body.

7. In a method of curing cementitious bodies, the steps of: applying a substantially liquid, aqueous suspension of finely divided diatomaceous earth to the surface of a cementitious body to form a removably adherent coating thereon, said aqueous suspension including starch; and then applying a liquid sealing medium to the surface of said coating, said sealing medium being adapted to form a film adapted to retard evaporation of moisture from said coating and from said cementitious body.

CARLL W. HUNT.